Jan. 23, 1962 R. C. NORRIE 3,017,944
HOOD-AND-FENDER ASSEMBLY FOR AUTOMOTIVE TRUCKS
Filed April 9, 1959 3 Sheets-Sheet 1
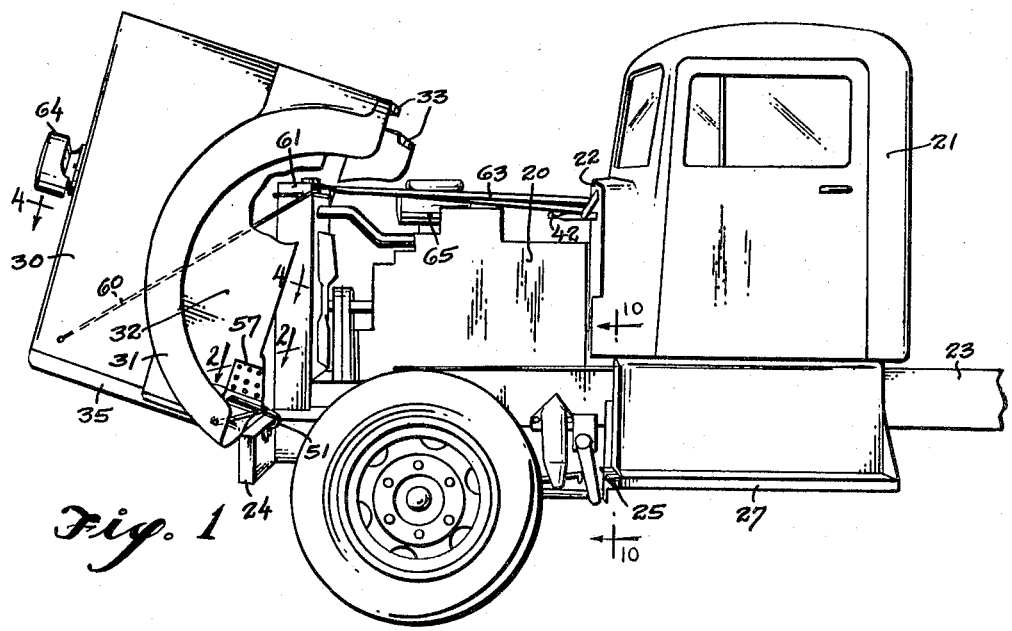
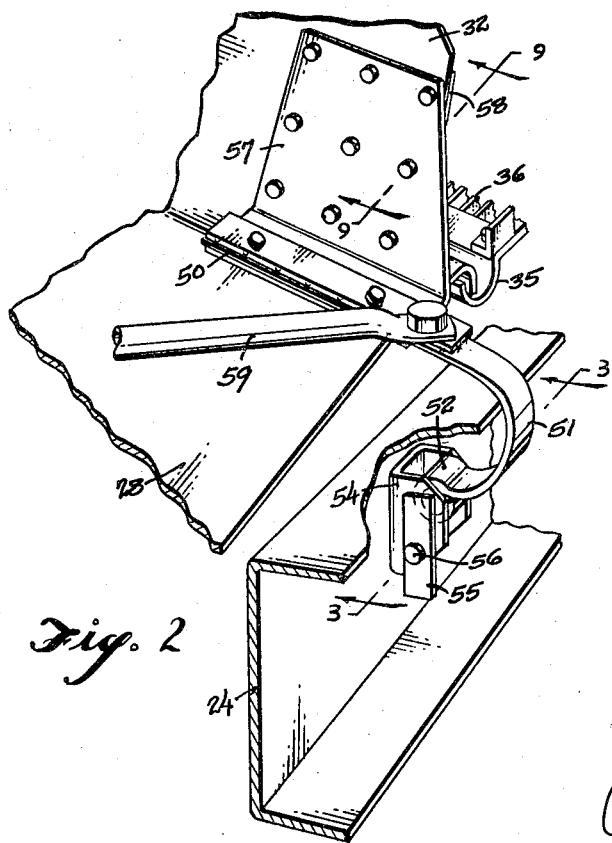
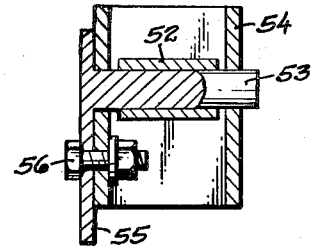
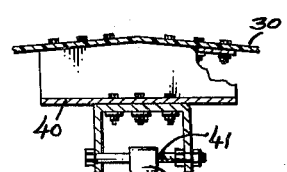
INVENTOR.
Robert C. Norrie
BY
Barnes + Reed
ATTORNEYS Jan. 23, 1962 R. C. NORRIE 3,017,944
HOOD-AND-FENDER ASSEMBLY FOR AUTOMOTIVE TRUCKS
Filed April 9, 1959 3 Sheets-Sheet 2

INVENTOR.
Robert C. Norrie
BY
ATTORNEYS

Jan. 23, 1962 R. C. NORRIE 3,017,944
HOOD-AND-FENDER ASSEMBLY FOR AUTOMOTIVE TRUCKS
Filed April 9, 1959 3 Sheets-Sheet 3
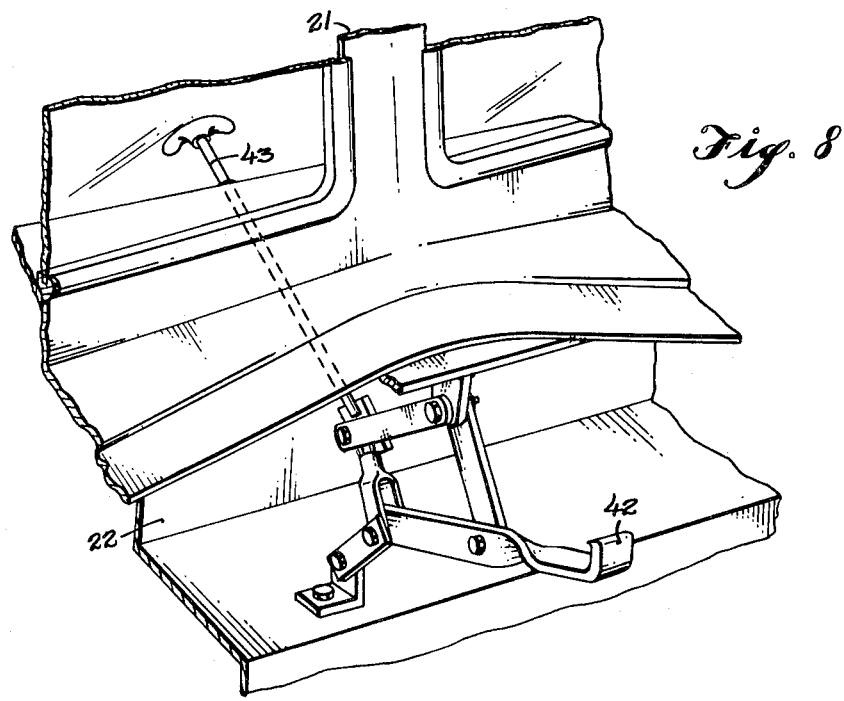
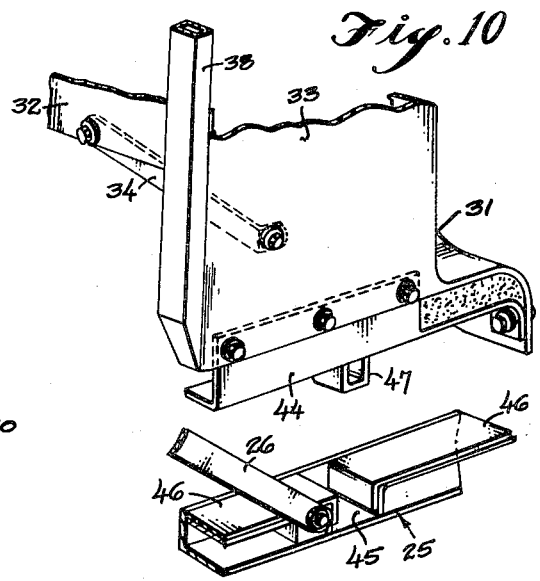
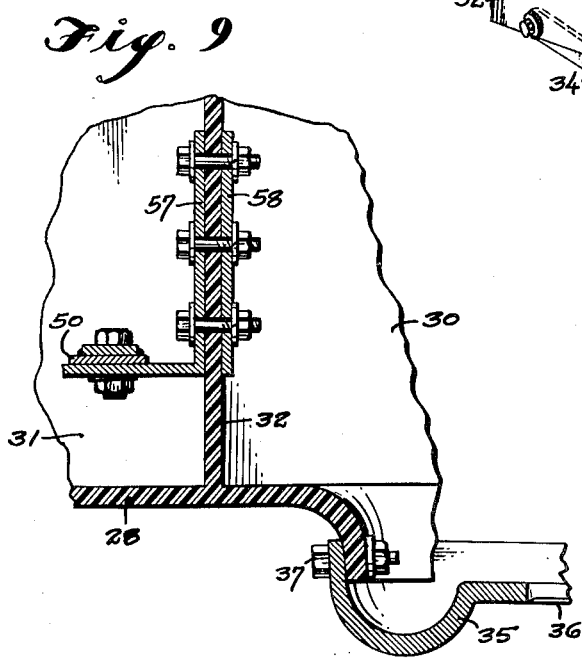
INVENTOR.
Robert C. Norrie
BY
ATTORNEYS United States Patent Office 3,017,944
Patented Jan. 23, 1962

3,017,944
HOOD-AND-FENDER ASSEMBLY FOR
AUTOMOTIVE TRUCKS
Robert C. Norrie, Seattle, Wash., assignor to Pacific Car
and Foundry Company, Seattle, Wash., a corporation
of Washington
Filed Apr. 9, 1959, Ser. No. 805,195
6 Claims. (Cl. 180—69)

This invention relates to hoods for automotive trucks, and particularly trucks of the type in which the compartment occupied by the engine is covered by a hood and there is provided a fender or fenders adjoining said hood and defining a pocket for a respective steerable front wheel. Teachings of the present invention adapt themselves both to the conventional type of truck in which the engine compartment lies to the front of the cab and to the type of truck commonly known as a cab-beside-engine design.

The principal object of the invention is to provide a hood molded from fiberglass and including a fender or fenders unitized with the hood as an integral assembly.

As a further important object the invention aims to provide a unitized hood assembly so designed and tilt-mounted as to give engine accessibility comparable to that presently available in cab-over-engine trucks.

Further objects and advantages of the invention are to provide a unitized hood assembly which may be easily and quickly tilted from a normal closed position into an open position, an assembly which may be easily and quickly removed from the truck, an assembly which gives great structural rigidity, yet is sufficiently flexible to "roll with the punch" so that repairs are kept to a minimum, but permits repairs, if necessary, to be made simply and without need of special tools, an assembly which is rust-free, an assembly which is unusually quiet in the over-the-road operation of the truck, and an assembly which gives a substantial weight saving as compared with metal structures.

Still additional objects and advantages of the invention will, with the foregoing appear and be understood in the course of the following description and claims, the invention consisting in the novel construction and in the adaptation and combination of parts hereinafter described and claimed.

In the accompanying drawings:

FIGURE 1 is a fragmentary perspective view portraying a truck equipped with a hood-and-fender assembly constructed to embody the preferred teachings of the present invention.

FIG. 2 is a fragmentary perspective view drawn to an enlarged scale from the approximate vantage point shown by the section line 2—2 of FIG. 1.

FIG. 3 is a transverse vertical sectional view drawn to an enlarged scale on line 3—3 of FIG. 2.

FIG. 8 is a fragmentary perspective view to illustrate latching mechanism for the hood assembly operable from within the operator's cab.

FIG. 9 is a fragmentary horizontal sectional view, looking upwardly, and drawn to an enlarged scale on line 9—9 of FIG. 2.

FIG. 10 is a fragmentary perspective view drawn to an enlarged scale from the approximate vantage point shown by the line 10—10 of FIG. 1 and indicating the aft end of the assembly momentarily before coming to rest as it is being swung into a closed position; and FIG. 11 is a fragmentary transverse vertical sectional view on line 11—11 of FIG. 5.

Figure 4:
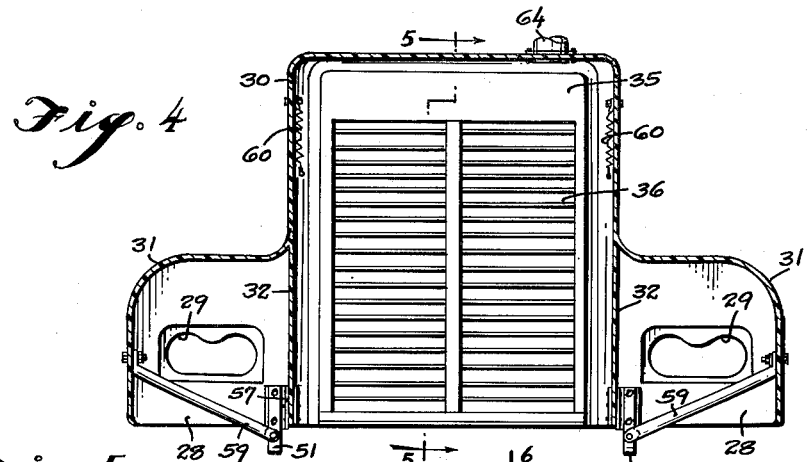
FIG. 4 is a transverse vertical sectional view of the hood-and-fender assembly drawn to an enlarged scale on line 4—4 of FIG. 1 and deleting any showing of the truck.

The automotive truck for which the hood of the present invention is especially devised is of the conventional character in which the motor, designated by the numeral 20, occupies a compartment lying to the front of the driver's cab 21. A cowl 22 separates said compartment from the interior of the cab. The motor and the cab derive support from a main frame commonly comprised of channel principals 23 extending longitudinally of the vehicle one at one side and the other at the other side of the longitudinal median line, and connected at spaced intervals of the length by transverse members.

The longitudinal principals have drop ends at the front (see FIG. 5) and one of said transverse members extends across the extreme front of said drop ends and is prolonged laterally beyond the latter at each side of the vehicle. The prolongations are denoted by 24 and act in conjunction with brackets 25 to support the front and rear ends, respectively, of the unitized hood assembly of the present invention. The brackets will be hereinafter more particularly described but suffice it to here say that the same extend laterally as outriggers from the frame principals 23, being each located at the front extremity of a related running board 27 on much the same horizontal plane as the frame prolongations 24 with the inner end securely attached to a frame-carried hanger and the outer end braced by a bar 26 extending diagonally from the frame. The connection between the hood assembly and the prolongations is that of a hinge permitting the hood to swing forwardly about a transverse horizontal axis. The brackets 25 provide a rear-end rest for the lowered hood assembly.

The hood proper of said assembly is designated by 30 and is made integral with the fenders 31, being molded as a unitized structure from reinforced fiberglass. Between the engine compartment at the center and the wheel pocket at each side said hood assembly presents a respective longitudinally extending vertical partitioning wall 32. The transverse wall 28 which lies to the front of each wheel pocket is molded solid and has openings 29 routed therefrom to accommodate twin head-lights. Neither these head lights nor turn-signal lights which surmount the fenders are shown in the drawings. Each wheel pocket has a transverse rear wall 33 extending by its lower edge somewhat below the bottom edge of the partitioning walls. Each said depending portion is braced by a bar 34 running diagonally therefrom to the adjacent partitioning wall.

It will be understood that the molded center section of the assembly is in the nature of a barrel vault in that the same has an arched ceiling and is open along the bottom and both ends. A radiator shell 35 with associated grille or the like 36 is fitted in the front opening, being secured by bolts 37, and a box section arch 38 reinforces the marginal edge of the rear opening. This arch 38 is or may be composed of fiberglass integrated by tape and resin with the fiberglass of the hood assembly.

To the immediate front of said arch 38 on the longitudinal median line of the hood there is provided a bracket 40 presenting a cross-pin 41 adapted, when the hood occupies its normal closed position, to be caught by a hook 42. The hook is moved into and out of engagement with the pin by a toggle mechanism (see FIG. 8), actuated from within the cab by a hand-operated push-pull rod 43. When swung into said closed position the hood is localized against lateral play by two guides 47, each carried as a depending tongue from a respective one of two angle bars 44 bolted to the bottom edges of the end walls 33. These guide tongues each fit in a socket 45 presented by a respective one of the two aforementioned brackets 25. Rubber strips 46 are bonded to the brackets as surface liners for the upper face of the bracket and the two side walls of the socket.

The hood is hingedly connected to each of the two prolongations 24, comprising in each instance a vertically disposed strap fixed by an upper portion 50 to the hood with a lower portion 51 depending below the hood and presenting an eyed end 52 for the reception of a respective one of two co-axial hinge pins 53. The cross-member of the frame which forms said prolongations 24 is a channel member having its flanges pointed toward the rear, and in compensation of this channel shape the depending portion 51 of said hinge straps is goosenecked. The eyed ends 52 (see FIGS. 2 and 3) are received in the throat of a respective U-shaped bracket 54 rigidly secured to the web of the related prolongation. The horizontal hinge pins 53 traverse the side walls of said brackets and are made integral with a locking plate 55 bolted, as at 56, to the bracket. In fixing the hinge straps to the hood the same are rigidly bolted, in a manner permitting vertical adjustment, to one leaf of an angle clip 57. The other leaf is bolted to the partitioning wall 32. A complementing clip 58 backs the opposite face of the partitioning wall. A brace 59 extends laterally to the related fender 31 from each hinge strap.

Figure 5:
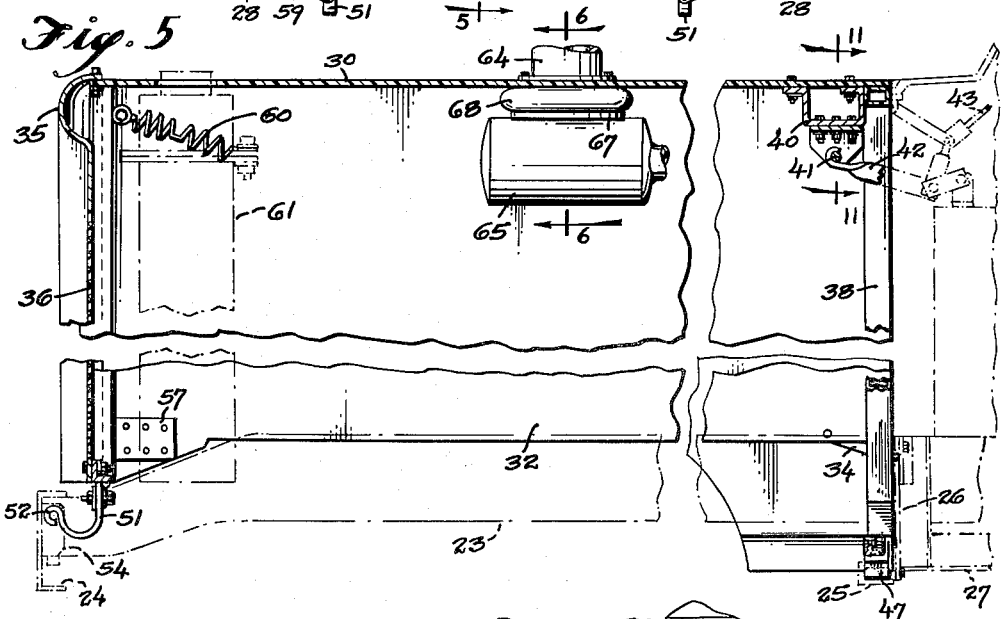
FIG. 5 is a fragmentary longitudinal vertical sectional view drawn to an enlarged scale on line 5—5 of FIG. 4.
Figures 6, 7:
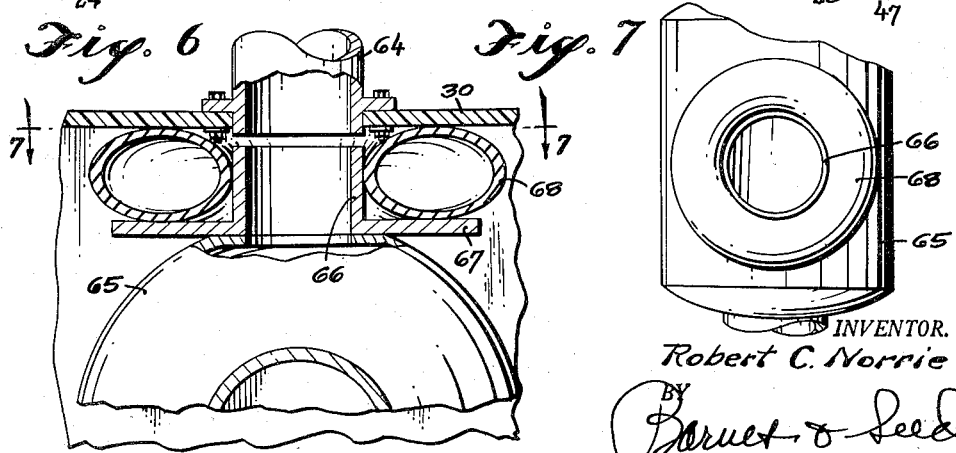
FIG. 6 is a fragmentary transverse vertical sectional view drawn to an enlarged scale on line 6—6 of FIG. 5.
FIG. 7 is a reduced-scale fragmentary horizontal section on line 7—7 of FIG. 6.

As can be seen from an inspection of FIGS. 1 and 5 there is provided a stop which establishes a forward limit of swing for the hood. This stop comprises for each side of the hood, a length of cable 60 secured at one end to the upper front corner of the hood and detachably secured at the other end to the vehicle radiator 61. The cable employed is "aircraft" cable, having windings of opposite direction impressed upon the two ends so that the cable may be readily extended into a straight-line condition (FIG. 1) from the normal contracted condition in which it is portrayed in FIG. 5. The oppositely directed windings hold the convolutions in co-axial condition as contraction takes place. The radiator lies to the immediate front of the engine 20, resting by its bottom upon the vehicle frame and deriving support at the top from braces 63. The cable which I prefer to employ is a coiled product of American Chain & Cable Co., having the two ends coiled in opposite directions from a center point so that the cable normally will contract itself into a short compass but admits of being extended under force of pull without imposing a twist to the anchored ends.

A feature of the present invention is its provision of an automatic make-and-break connection sealing an air stack 64 which is attached to the hood to an air cleaner 65 which is carried by the engine as a fixed adjunct thereof.

The stack is made to register with a thimble 66 fixedly attached to the air cleaner so as to surmount the same with its interior in communication with the ingress opening of the cleaner. The thimble has a base flange 67 thereon and there is fitted on the thimble, so as to bear against the base flange, an inflated pneumatic tube 68 whose axial length moderately exceeds the length of the neck of the thimble. When the hood is closed upon the engine the underside of the hood's top wall slightly compresses the rubber tube and automatically seals the air cleaner from the interior of the engine compartment.

It is believed that the invention will have been clearly understood from the foregoing detailed description of my now-preferred illustrated embodiment. For normal servicing of the engine the hood can be tilted forwardly through very nearly a 90° swing, giving complete access to the engine, its accessories, and cooling system in their entirety. The complete hood-and-fender assembly can be raised manually by the mechanic or driver without assistance. The mechanic can step inside the front wheel of the vehicle and have his work directly in front of him at bench height, and his tools within easy, instant reach. When moved to the front limit of swing movement, the weight center of the assembly lies to the front of the hinge axis so as to preclude the need for any prop in maintaining the hood in its open condition. Should it be desired to "pull" either the engine or the radiator, the hood can be taken completely clear of the truck in a matter of minutes. This is accomplished simply by releasing the latching hook 42, removing the two hinge pins 53, disconnecting the limit cable 60, and releasing quick-disconnect fasteners (not shown) which are provided in the wiring harness for the headlights and turn signals. Two men, one upon each of the two sides of the hood, can then lift the hood clear of the vehicle.

What I claim is:

1. In combination with an automotive truck of the conventional type having its engine mounted to the front of the driver's cab and with steerable front wheels at opposite sides of said engine, a unitized housing structure molded from fiberglass-reinforced resin to a form providing a hood for the engine together with a fender at each side thereof for the two steerable front wheels, said unitized structure including a respective partitioning wall extending longitudinally between the chamber of said hood which houses the engine and the pockets of the two fenders which house the wheels, a respective rear closure being provided for each of said fender pockets extending as an integral reinforcing from the related partitioning wall to the related outer wall of the unitized structure, and a hinge attachment at the lower front end of said housing structure connecting the same to the frame of the truck and permitting said housing to be tilted about a transverse horizontal axis between a lowered closed position and an elevated open position.

2. In combination with an automotive truck of the conventional type having its engine mounted to the front of the driver's cab and with steerable front wheels at opposite sides of said engine, a unitized housing molded from fiberglass-reinforced resin to a form providing a hood for the engine together with a fender at each side thereof for the two steerable front wheels, and a hinge attachment at the lower front end of said housing connecting the same to the frame of the truck and permitting said housing to be tilted about a transverse horizontal axis between a lowered closed position and an elevated open position, the truck frame including a rearwardly facing transverse channel member at the front of the vehicle presenting at each of the two ends a prolongation extending laterally beyond a respective one of two spaced apart longitudinal frame principals, the hinge connection comprising, for each side of the housing, a respective strap which is secured to the hood and presents a depending eyed end arranged to occupy the interstice between two transversely spaced vertical plate members rigid with the back wall of the related frame prolongation and engaged by a horizontal hinge pin traversing said plate members and made removable therefrom so that the unitized housing may be detached from the truck.

3. Structure according to claim 2 in which said depending end of the hinge strap has a goose-neck configuration, as viewed from the side, in compensation of the channel shape of the prolongation.

4. In an automotive truck of the conventional character having its engine located between steerable front wheels, providing a cab for the operator located to the rear of said engine, and having an engine-cooling radiator mounted in a fixed position to the front of the engine and stiffened by braces extending over the top of the engine from the top of the radiator to the front wall of the cab, a housing molded from fiberglass-reinforced plastic so as to combine a hood for the engine and fenders for the front wheels in a single unitized structure of which the fenders extend very nearly the full length of the housing while rising to approximately half the overall height of the housing, the front portion of said fenders having openings accommodating head lights for the truck, the hood having much the shape of a barrel vault open at the front and rear to accommodate the radiator and the radiator braces, respectively, hinges at each side of the radiator opening pivotally connecting the lower front edge of the housing to the frame of the vehicle supporting the housing for forward swing motion about a transverse horizontal axis between a lowered closed position and a raised engine and wheel-exposing open position, means prescribing a limit to which the housing swings in its movement to said open position, and means for releasably latching said housing to the vehicle cab, said fenders reinforcing the housing against deformation and, with the hood, providing an unbroken profile when viewed from the front, the stiffening office performed by the fenders being augmented by a radiator shell which rims the front opening of the hood portion and by a reinforcing arch which rims the rear opening of the hood portion, said reinforcing arch being sectionally of a shape resistant to deformation of its arch configuration and being made an integral part of the housing.

5. In combination with an automotive truck of the conventional type having its engine mounted to the front of the driver's cab and with steerable front wheels at opposite sides of said engine, a unitized housing molded from fiberglass-reinforced resin to a form providing a hood for the engine together with a fender at each side thereof for the two steerable front wheels, the hood portion of said housing having a configuration sugggesting a barrel vault open at both ends and with each of said end openings marginally reinforced, and a hinge attachment at the lower front end of said housing structure connecting the same to the frame of the truck and permitting said housing to be tilted about a transverse horizontal axis between a lowered closed position and an elevated open position, the reinforcing for the front-end opening comprising a shell for an engine cooling radiator which is unattached to the hood.

6. Structure according to claim 5, said reinforcing for the rear-end opening comprising an arch member having a sectional shape resistant to deformation of its arch configuration.

References Cited in the file of this patent

UNITED STATES PATENTS

| | | |
|---|---|---|
| 588,351 | Pierce | Aug. 17, 1897 |
| 1,439,452 | Shaw | Dec. 19, 1922 |
| 2,564,888 | Foley et al. | Aug. 21, 1951 |
| 2,612,233 | Newell | Sept. 30, 1952 |
| 2,672,942 | Bayley | Mar. 23, 1954 |
| 2,701,024 | Thomas | Feb. 1, 1955 |
| 2,808,893 | Dorman et al. | Oct. 8, 1957 |

FOREIGN PATENTS

| | | |
|---|---|---|
| 670,274 | Great Britain | Apr. 16, 1952 |

OTHER REFERENCES

"Motor," vol. 97, issue 4, April 1952, page 142.
"Fiberglass Auto Body Construction" by: John A. Wills (Dan R. Post Publications of Arcadia, Calif.) pages 6, 7, 8, 65 and 67.